March 1, 1938.　　　A. P. FERGUESON　　　2,109,666
TIRE COVER
Original Filed Sept. 8, 1932
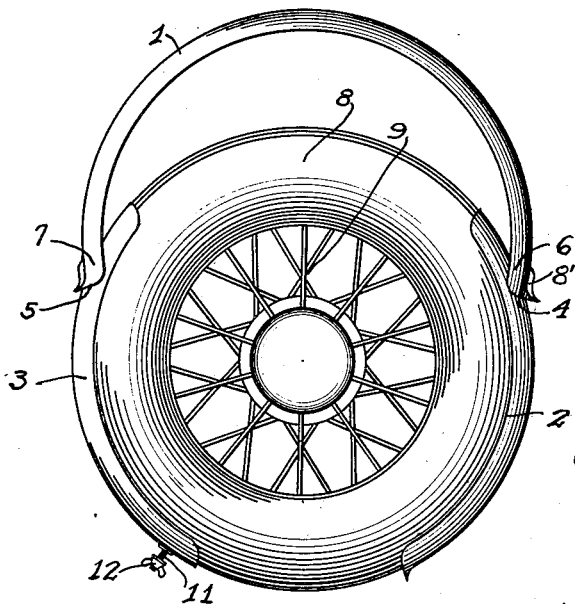
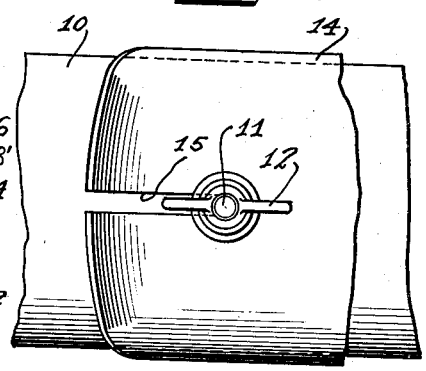
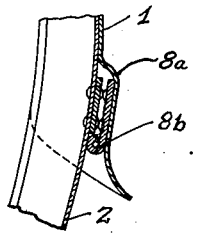
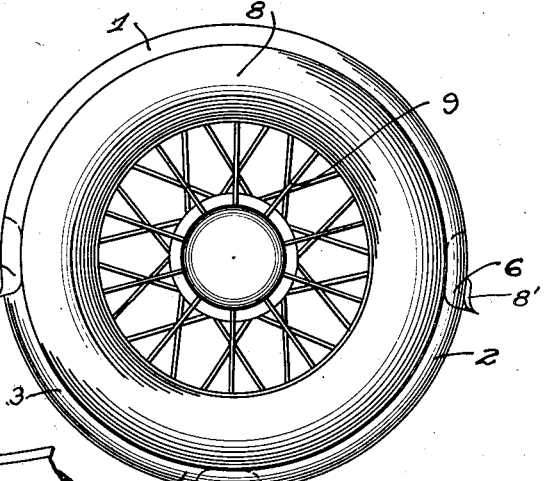
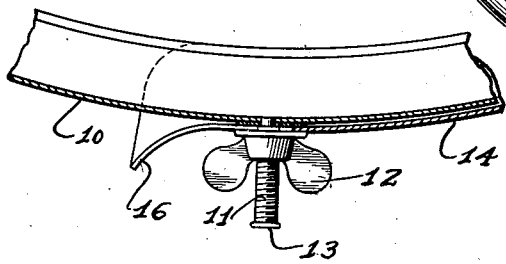
Inventor
ARTHUR P. FERGUESON.

Patented Mar. 1, 1938

2,109,666

UNITED STATES PATENT OFFICE 2,109,666

TIRE COVER

Arthur P. Fergueson, Detroit, Mich., assignor, by mesne assignments, to Houdaille-Hershey Corporation, Detroit, Mich., a corporation of Michigan Original application September 8, 1932, Serial No. 632,101. Patent No. 2,085,213, dated June 29, 1937. Divided and this application September 25, 1936, Serial No. 102,506

8 Claims. (Cl. 150—54)

This invention relates to tire covers and more particularly to a spare tire cover of the sectional type.

This is a division of my copending application for "Tire cover", Serial No. 632,101, filed September 8, 1932, and patented June 29, 1937, No. 2,085,213.

It is an object of the present invention to provide a novel and improved spare tire cover of the sectional type which is economical to manufacture and which is rugged and reliable in use.

It is a further object of this invention to provide a shove down tire cover such as a hood embodying a sectional tread covering member which may be employed alone or in cooperation with a side wall covering member or plate.

A further object of this invention is to provide a novel tire cover comprising a plurality of sections, one of which serves to clamp itself and the other or others on the spare tire.

Another and further object of this invention is to provide a sectional tire cover, the sections of which are pivotally connected to each other.

A further object of this invention resides in the provision of a spare tire cover formed in sections arranged to be automatically interlocked when applied in tire covering position.

Another object of this invention is to provide a cover of the character above referred to which will adapt itself to tires of various sizes.

In accordance with the teachings of my invention, one of the principal features includes a resilient rim portion which is substantially arcuate in form and of sufficient length to extend throughout more than 180° when in tire covering position. A second and shorter section, which may or may not be resilient, is pivoted intermediate its end to one end of the first section and is of a curvature substantially corresponding to that of the tread of a spare tire to be covered. The parts are placed over the tread of the tire substantially at a medium plane of the tread of the tire. The first section is then pressed or shoved onto the tread until it is in substantially intimate embracing relation thereto, the second section being in part overlapped and engaged by the adjacent end portion of the first section, said first section serving to hold both sections firmly above the tread. If desired, a section similar to the second section above described may be connected to the opposite end of the first section. When used with a plate for covering the side wall of the tire, the plate is arranged to have a major portion of its outer edge overlapped by the section of the cover. When two auxiliary sections are used in conjunction with the main section above described, such for example as when the tire cover is used in conjunction with a spare tire which is mounted at the rear of a vehicle, the free ends of the auxiliary section are preferably arranged to overlap each other so that they may be clamped together at their free ends. The free ends of a cover such as that just referred to are preferably arranged to be adjusted so that the sectional cover is susceptible of being used in conjunction with spare tires of various sizes.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawing in which:

Figure 1 is an elevational view illustrating one embodiment of my invention, the spare tire cover being shown in its unattached relation to the spare tire;

Figure 2 is a view similar to Figure 1, but shows the spare tire cover in its attached position on the tire;

Figure 3 is an enlarged fragmentary view illustrating the manner in which the free ends of the auxiliary sections of a spare tire cover may be clamped together;

Figure 4 is an enlarged fragmentary elevational view partly in cross section of the clamping means illustrated in Figure 3; and Figure 5 is a fragmentary view illustrating the hinge connection between the auxiliary sections and the main section of the tire cover.

Referring now to the drawing, the specific embodiment of my invention illustrated therein comprises a multisectional spare tire cover of the type which is particularly applicable for spare tires which are mounted on the rear of vehicles or which are mounted on the side of vehicles without the cooperation of a fender well or the like. The multi-sectional tire cover illustrated in the drawing includes a main section 1 and two auxiliary sections 2 and 3. The auxiliary sections 2 and 3 are hinged intermediate their ends at 4 and 5 to opposite ends 6 and 7 of main section 1. The ends 6 and 7 of main section 1 are formed with bulge 8a for receiving the hinge hardware 8b. The ends of section 7 have their extremities flared adjacent the bulge to allow a substantial degree of relative angular movement between the auxiliary sections 2 and 3 and the main section 1, it being understood that the extremities serve as a stop to limit this degree of angular movement. It will be seen upon a close inspection of the drawing that auxiliary sections 2 and 3 nest within main section 1.

The main section 1 of the tire cover comprises a resilient and preferably metallic arcuate section which is arranged to cover more than half of the tire when in proper tire protecting position, as shown in Figure 2. Sections 2 and 3 may or may not be resilient and are preferably arranged so that they may conform to various sizes of tires. Main section 1 is preferably formed with a radius slightly less than that of the smallest tire for which it is adapted to cover. Thus section 1 will tightly embrace the tire tread and also press sections 2 and 3 inwardly, thereby functioning to resiliently resist removal from the tire.

As shown in the drawing, a side plate 8 is used in conjunction with the tire cover for covering the side wall of a tire (not shown) which is carried on spare wheel 9.

Sections 2 and 3 are of such length that when they are arranged as shown in Figure 2, the entire tread covering portion which includes main section 1 and auxiliary sections 2 and 3 embrace in excess of 360°, the free ends of sections 2 and 3 overlapping, as shown in Figures 2, 3, and 4. The free end 10 of section 3 carries a threaded stud 11 which is preferably permanently fastened thereto, and a wing nut 12 is carried on stud 11. Stud 11 preferably is enlarged at its free end 13 to prevent separation of wing nut 12 therefrom. The cooperating end 14 of section 2 is formed with a substantially centrally located slot 15 for receiving stud 11, the length of slot 15 being of sufficient extent to allow the ends 10 and 14 to be placed in proper relation to each other for accommodating tires of various sizes before the nut 12 is rotated to clamp the ends 10 and 14 together.

The extremity 16 of end 14 is curved away from the center of the cover in a manner corresponding with the extremities 6 and 7 of main section 1 in order to continue the ornamental scheme of the cover. Curved extremity 16 also serves the useful function of providing an abutment for preventing accidental separation of ends 10 and 14 should the nut 12 become loosened. The flaring of end 16 performs the still further function of allowing ends 10 and 14 to automatically overlap upon coming together as the tread covering member is applied into covering relation to the tire. It will be apparent to those skilled in the art, once nut 12 is tightened, rattling between the various parts of the tire cover is prevented.

The manner of assembling the multi-sectional tire cover on a spare tire will now be described. Sectional parts 1, 2, and 3 are arranged in the medium plane of the tire with the ends 10 and 14 spaced apart a distance equal to or slightly in excess of the diameter of the tread of the tire. The tread covering member is thereupon moved in its own plane towards the tire, the center of the section 1 moving in an imaginary line connecting the same with the center of the tire. As this movement is continued, the ends 6 and 7 engage the tire and act as pivots about which the remaining of the sections 2 and 3 swing until the parts are arranged as shown in Figure 1. As section 1 is thereafter continued in its movement toward the center of the tire, the ends of this section are cammed outwardly by the tire until they move beyond diametrically opposite lateral tire tread portion from whence they thereafter move toward each other to occupy the position shown in Figure 2. During this latter movement, sections 2 and 3 are held adjacent the tread of the tire by virtue of the spring pressure of the ends of section 1, and as the ends 10 and 14 come together, the flared part or extremity 16 permits the end 14 to slide over the end 10, the stud 11 slipping into slot 15 of end 14. Nut 12 is tightened to hold the parts against rattling.

In the event that side plate 8 is also used, the latter is easily placed against the outer side wall of the tire and held there until the parts are positioned as shown in Figure 1, after which the plate 8 may be released, since part of the tread covering member will hold the side plate in place without additions.

From the above description, it will be seen that I have provided an extraordinarily simple and yet effective multi-sectional tire cover of the type which is adapted to completely cover the tread of a tire. The tire cover may be assembled on the tire with a minimum amount of effort, and yet after the tire cover is in its proper position, it is free from rattling or other objectionable vibration.

While I have shown a particular embodiment of my invention, it will of course be understood that I do not wish to be limited thereto, since many modifications may be made, and I therefore contemplate by the appended claims to cover all such modifications that fall within the true spirit and scope of my invention.

I claim as my invention:

1. A shove-down sectional tire cover comprising a pair of sections for covering the tread of a spare tire, a third section pivoted to the first sections intermediate the ends thereof to thereby form a unitary structure, the third section being resilient and having a normal diameter which is less than that of the tread of the spare tire, and being of such length that, when in proper tread covering position, it subtends an angle in excess of 180°, whereby to resiliently hold itself and the other sections in embracing relation to the tread of the tire.

2. A shove-down sectional tire cover comprising a pair of sections for covering the tread of a spare tire, a third section pivoted to the first sections to thereby form a unitary structure, the third section being resilient and having a normal diameter which is less than that of the tread of the spare tire, and being of such length that, when in proper tread covering position, it subtends an angle in excess of 180°, whereby to resiliently hug the tread of the tire, the ends of the other sections being arranged to overlap when the cover is in proper tire protecting position, and means associated with one of said ends to guide the other end automatically into overlapped relation therewith when said ends come together.

3. A shove-down sectional tire cover comprising a pair of sections for covering the tread of a spare tire, a third section pivoted to the first sections to thereby form a unitary structure, the third section being resilient and having a normal diameter which is less than that of the tread of the spare tire, and being of such length that, when in proper tread covering position, it subtends an angle in excess of 180°, whereby to resiliently hug the tread of the tire, the first sections having ends arranged to overlap when the cover is in proper tire protecting position, and means associated with one of said ends to guide the other end automatically into overlapped relation thereto when said ends come together, the other end of at least one of said first sections being overlapped by the resilient section, whereby the first end of said one section may be swung away from the tire about said other end as a center, thereby spreading the ends of the resilient section so that the cover may be readily removed from the tire.

4. A tire cover comprising mutually hinged tire covering sections, one of said sections being resilient and formed to hug the tread and being of such length that it subtends an angle in excess of 180° when in proper tread covering position, the other section having an end which is overlapped by the first section, whereby, upon swinging the other section about said end as a center, the ends of the first section will be separated and the cover readily removed from the tire, and means for locking said sections together as a rigid body as they assume their proper tread covering positions.

5. Tire cover construction comprising three parts having curvatures approximating that of the tread of a spare tire, means for pivotally connecting one of said parts to the other two parts to thereby form a unitary structure, said one part being resilient and having a normal diameter which is less than that of the tread of the tire, and being of such length that, when in proper tread covering position, it subtends an angle in excess of 180°, whereby to resiliently hug the tread of the tire, and means for connecting said other parts together to thereby completely circumscribe the tread when the cover construction is in proper tire protecting position.

6. Tire cover construction comprising three parts having curvatures approximating that of the tread of a spare tire, means for pivotally connecting one of said parts to the other two parts to thereby form a unitary structure, said one part being resilient and having a normal diameter which is less than that of the tread of the tire, and being of such length that, when in proper tread covering position, it subtends an angle in excess of 180°, whereby to resiliently hug the tread of the tire, and means for securing said other parts in overlapped relation when the cover construction is in proper tire protecting position.

7. As an article of manufacture, a spare tire cover comprising a plurality of overlapped tread engaging parts disposed over the outer periphery of the tire and connected together for relative movement, one of the parts having an end under another cover part in engagement with the tire tread positioned to serve as a bearing point on the tire tread about which said one part may be swung to enable both it and said other part to be removed bodily from the tire.

8. As an article of manufacture, a spare tire cover comprising a plurality of overlapped tread engaging parts disposed over the outer periphery of the tire and connected together for relative movement, one of said parts having an end engaging the tire tread under an adjoining end of the other part so as to afford a bearing point on the tire tread as well as being connected to the other part in such a manner as to serve as a camming lever for prying said other part off the tire.

ARTHUR P. FERGUESON.